US011492144B2

(12) United States Patent
Ehinger et al.

(10) Patent No.: US 11,492,144 B2
(45) Date of Patent: Nov. 8, 2022

(54) FLYWHEEL HAVING TUNED MASS DAMPERS

(71) Applicant: Rockwell Collins Deutschland GmbH, Heidelberg (DE)

(72) Inventors: Markus Ehinger, Weinheim (DE); Dirk Henning, Weinheim (DE)

(73) Assignee: ROCKWELL COLLINS DEUTSCHLAND GMBH, Heidelberg (DE)

( * ) Notice: Subject to any disclaimer, the term of this patent is extended or adjusted under 35 U.S.C. 154(b) by 52 days.

(21) Appl. No.: 17/057,735

(22) PCT Filed: May 6, 2019

(86) PCT No.: PCT/EP2019/061570
§ 371 (c)(1),
(2) Date: Nov. 23, 2020

(87) PCT Pub. No.: WO2019/223990
PCT Pub. Date: Nov. 28, 2019

(65) Prior Publication Data
US 2021/0206518 A1    Jul. 8, 2021

(30) Foreign Application Priority Data
May 24, 2018    (DE) .......................... 102018112496.1

(51) Int. Cl.
*B64G 1/28*       (2006.01)
*F16F 15/131*    (2006.01)
(Continued)

(52) U.S. Cl.
CPC ........ *B64G 1/283* (2013.01); *F16F 15/13107* (2013.01); *F16F 15/1414* (2013.01); *F16F 15/30* (2013.01); *B64G 2001/228* (2013.01)

(58) Field of Classification Search
CPC .............. B64G 1/283; B64G 2001/228; F16F 15/13107; F16F 15/1414; F16F 15/30;
(Continued)

(56) References Cited

U.S. PATENT DOCUMENTS 4,892,174 A    1/1990   Takekado
6,012,680 A *  1/2000   Edberg ..................... F16F 1/46
                                                      244/173.2
(Continued)

FOREIGN PATENT DOCUMENTS

CN    101187410 A *  5/2008
DE    2225925 A1     1/1974
(Continued)

OTHER PUBLICATIONS

EPO Translation of CN 101187410 A, Zang et al., May 28, 2008. (Year: 2022).*

*Primary Examiner* — Daniel D Yabut
(74) *Attorney, Agent, or Firm* — Murphy, Bilak & Homiller, PLLC (57) ABSTRACT

The invention relates to a flywheel for stabilising the position of a spacecraft, comprising a hub means (1) for fastening the flywheel, a flywheel ring (4), which externally surrounds the hub means (1) circumferentially at a distance, a support means (3) for supporting the flywheel ring (4) on the hub means (1), and a vibration damping device (6, 8) having a tuned mass damper means (8) which is axially movable back and forth relative to the flywheel ring with respect to a rotation axis of the flywheel.

15 Claims, 7 Drawing Sheets

(51) Int. Cl.
*F16F 15/14* (2006.01)
*F16F 15/30* (2006.01)
*B64G 1/22* (2006.01)

(58) Field of Classification Search
CPC .............. F16F 15/1201; F16F 15/1219; F16F 15/1292; F16F 15/1392; F16F 15/136; F16F 15/1395
See application file for complete search history.

(56) References Cited

U.S. PATENT DOCUMENTS

2003/0006341 A1* 1/2003 Buder .................... B64G 1/641
                                                          244/118.1
2005/0121896 A1   6/2005 Bonhard et al.
2005/0268735 A1  12/2005 Smith et al.

FOREIGN PATENT DOCUMENTS

| DE | 3207609 A1   | 10/1982 |
|----|--------------|---------|
| DE | 8806742.4 U1 | 8/1988  |
| DE | 3921765 A1   | 1/1991  |
| DE | 19841418 A1  | 3/1999  |
| DE | 10037680 A1  | 2/2002  |
| DE | 10238605 A1  | 5/2003  |
| DE | 10238605.6 B4| 3/2007  |
| JP | 63188360     | 12/1988 |
| JP | 3314448 B2   | 6/2002  |
| JP | 2002276539 A | 9/2002  |
| JP | 2003184946 A | 7/2003  |
| JP | 2007100901 A | 4/2007  |

* cited by examiner

FLYWHEEL HAVING TUNED MASS DAMPERS

The invention relates to a flywheel device for stabilizing the position of a spacecraft, in particular, for controlling the position of satellites.

Such flywheels or reaction wheels are known to control the alignment of satellites. The flywheel is set rotating by a drive, so that a stabilizing effect can be achieved by the gyroscopic effect. To achieve an efficient gyroscopic effect, it is convenient to position a largest possible part of the mass of the flywheel outwards as much as possible, so that this mass can rotate around the rotation axis of the flywheel at a largest possible diameter.

Such a flywheel device is known from DE 39 21 765 A1 which, similarly to the wheel of a bicycle, has an internal stator, an external rotor, and a hub rotatably supporting the rotor on the stator by means of spokes. The hub is rotatably supported on the stator by two rolling bearings which can be designed as fixed or floating bearings.

Such flywheels are the more efficient the lower their friction is in operation. This friction is, amongst others, determined by the size of the bearing unit and its prestressing. The bearing load in the case of a launch (launch of the rocket transporting the satellite) determines the size of the bearing unit since it must survive the load during the launch (acceleration, vibrations) without any damage. The potential load of the bearing depends on the rocket and on the resonances of the flywheel since the excitation of vibrations can result in a resonance rise of the bearing load.

Accordingly, it can be reasonable to take precautions with which such resonance rises and high bearing loads associated therewith can be prevented.

Therefore, the invention is based on the object to provide a flywheel for stabilizing the position of a spacecraft where any influence, in particular, a reduction of undesired resonance vibrations, is possible.

The object is achieved by a flywheel having the features of claim 1. Advantageous embodiments can be taken from the dependent claims.

A flywheel for stabilizing the position of a spacecraft is provided, comprising a hub means for fastening the flywheel, a flywheel ring which externally surrounds the hub means circumferentially at a distance, a support means for supporting the flywheel ring on the hub means, and comprising a vibration damping device with a tuned mass damper means which is, with respect to a rotation axis of the flywheel, axially movable back and forth relative to the flywheel ring.

The structure of the flywheel comprising the hub means, the flywheel ring and the support means is known per se. The support means can especially have spokes which extend radially between the hub means and the flywheel ring.

The hub means serves to fasten the flywheel in an appropriate manner, for example, on a bearing means with which the flywheel is rotatably supported on a stator.

The support means which, in turn, supports the flywheel ring on its radial outside surface, extends radially outwards from the hub means. The flywheel ring pools the actual mass which is set rotating for stabilizing the position in order to achieve the desired gyroscopic effect in this manner.

The bearing means or the stator supporting the bearing means attached to the hub means is not part of the flywheel.

The hub means, the support means and the flywheel ring should be rigidly connected to one another. In particular, it can be convenient to produce the hub means, the support means and the flywheel ring as one piece, for example, as a machined cast part. Also, it is possible to shape cut the hub means, the support means and the flywheel ring out of a metal block. Steel, especially stainless steel, but also aluminum is suited as the material. The external diameter can range between 80 mm and 400 mm, with also larger or smaller dimensions being possible.

The vibration damping device includes the tuned mass damper means which is movable back and forth, i.e. in an oscillating manner, in the axial direction relative to the flywheel ring. Axial movability of the tuned mass damper means should at least be possible to a small extent, i.e. at a low amplitude. Here, it has turned out that an amplitude of less than 5 mm, preferably even less than 1 mm, for example, in a range from 0.2 to 0.3 mm, can be sufficient.

In particular, during the launch of a rocket, the flywheel, especially the external flywheel ring, can be brought into a dangerous resonance vibration through a corresponding vibrational effect, which can lead to an excessive bearing load, which ultimately may even lead to destruction of the bearing means supporting the flywheel. Due to a corresponding adjustment of the tuned mass damper means, it is possible that the tuned mass damper means, which is axially movable back and forth to the flywheel ring, builds up a counter-vibration in order to reduce, i.e. to "absorb", the strong vibration of the flywheel ring or of the additional components associated therewith (in particular, the support means) in this manner. In this manner, a highly efficient vibration damping can be achieved.

The tuned mass damper means can be fastened on the flywheel ring and/or on the support means by a fastening means, with the fastening means being designed in such a manner that it enables axial movability of the tuned mass damper means.

Thus, the fastening means can be part of the vibration damping device and provide the desired oscillating axial movability of the tuned mass damper means.

Optionally, it is additionally possible that the fastening means also enables a radial degree of freedom of the tuned mass damper means. However, movements in the radial direction can be significantly smaller in relation to the axial movement.

The fastening means can have elastic ductility in at least one area, where the axial movability of the tuned mass damper means can be achievable through the elastic ductility of the fastening means. This means that the fastening means can have areas of different rigidity or elastic ductility. The elastic ductility (lower rigidity) should be larger than the ductility of the other components of the flywheel, in particular, of the flywheel ring or of the support means (for example, of the spokes). The areas of the fastening means with a rigid design serve to actually fasten the tuned mass damper means, while the areas of the increased elastic ductility serve to allow the relative movement of the tuned mass damper means.

The tuned mass damper means can have a plurality of tuned mass damper elements which are held, distributed on the perimeter at a distance, by the fastening means. The individual tuned mass damper elements can, for example, be designed in the form of cylindrical, barrel-shaped or rectangular steel elements and have a mass in a range from, e.g., 20 g to 150 g, in particular, in a range from 40 g to 100 g, e.g., approx. 60 g.

The tuned mass damper elements are to be held by the fastening means in an appropriate manner. In this process, it is intended that the tuned mass damper elements are elastically held by the fastening means to enable movability or upswinging.

In particular, the tuned mass damper elements are meant to be movable (in an oscillating manner) in the axial direction relative to the flywheel ring. In addition, it can be convenient if the fastening means also enables radial movability (radial degree of freedom) of the tuned mass damper elements, with, however, the movements in the radial direction being significantly smaller than the movements in the axial direction.

In one embodiment, the fastening means can have two damping rings which are arranged axially to one another in such a manner that the support means is arranged at least partially in between. In this process, the damping rings can be fastened to one another in such a manner that the support means is, seen in the axial direction, arranged between the two damping rings.

The two damping rings are thus fastened on the support means and can, for example, clamp the support means between them. The damping rings, in turn, serve as a fastening means to support the tuned mass damper means.

The support means can, for example, be formed by a plurality of spokes, which extend radially between the hub means and the flywheel ring. The two damping rings then each enclose an area of the spokes between them.

The number of spokes should be uneven and preferably correspond to a prime number. As a result, no standing waves and further undesired self-movements are created in the resonance behavior.

The tuned mass damper means can, in particular, have a plurality of tuned mass damper elements, where the tuned mass damper elements are held between the damping rings and can be arranged distributed along the peripheral direction of the damping rings. In this process, the damping rings can have areas of higher elasticity (lower rigidity) and lower elasticity (higher rigidity) along their perimeter, with the tuned mass dampers being fastened in the areas with higher elasticity. Thus, the areas of higher elasticity allow movement of the individual tuned mass damper elements in the desired manner, so that the tuned mass damper elements can axially vibrate relative to the flywheel ring or to the remaining flywheel.

The areas of higher and lower elasticity can be achieved in that the damping rings are designed thinner in places or have additional reinforcements (to achieve higher rigidity) in places.

The support means can have a plurality of spokes distributed on the perimeter, which extend radially between the hub means and the flywheel ring. In this process, the tuned mass damper elements can be arranged in corresponding interspaces between the spokes and held by the damping rings. In particular, the tuned mass damper elements can be held centrally between the spokes in the peripheral direction. Accordingly, the number of tuned mass damper elements can be equal to the number of spokes.

To achieve the desired vibration damping effect, it is reasonable if a main resonance of the tuned mass damper means is adjustable in such a manner that it essentially corresponds to the main resonance of the flywheel ring or of the entire flywheel, with the main resonance of the tuned mass damper means being adjustable by balancing the weight of the tuned mass damper elements and of the elastic ductility of the fastening means.

A centering means can be provided for centering the vibration damping device relative to the flywheel ring. The centering means can, for example, have suitable centering rollers, which abut on the inner diameter of the flywheel ring and serve for the concentric placement of the vibration damping device and thus the reduction of any imbalance.

In a variant with an optional addition which can achieve a further vibration damping effect, the damping rings can be fastened to one another in such a manner that relative movement between the damping rings on one hand and the support means on the other hand is enabled. Hence, it can be possible to fasten the damping rings to one another, for example, screw them together, and, in this process, clamp the support means (for example, the spokes) between the damping rings. When maintaining a specific, predetermined preload force between the two damping rings, a specific friction movement between the damping rings and the support means can be enabled.

In a variant, a friction support pad can, in the area of a particular contact area of the damping rings with the support means, be provided at least partially between the particular damping ring and the corresponding area of the support means.

If the damping rings are fastened on the support means in such a manner that relative movement between the damping rings and the support means is possible, this wanted movability can be supported by inserting the friction support pads. The friction support pads allow a defined friction between the damping rings and the support means.

For example, the friction support pads can be fitted on the outer ends of the spokes which serve as the support means and clamped by the damping rings. In the case of low excitation of vibrations, the clamping forces ensure that the damping rings are firmly coupled to the movement of the flywheel mass, i.e. especially of the flywheel ring, and that all movements are transferred to the damping rings. This, in particular, relates to vibrational movements with amplitudes in the axial direction of the flywheel.

If one of the main modes of the flywheel mass is excited, then the flywheel ring swings up in respect of the hub means. These eigenmodes are the critical case, the amplitude of which must be kept as small as possible in the resonance case. As soon as the vibration amplitude becomes that large that the static friction on the contact areas of the damping rings is exceeded, they start to slide relative to the friction support pads. Two systems with different resonance frequencies, which move relatively to one another, are thereby created.

The newly introduced kinetic energy is dissipated in the form of frictional heat.

The frequency of the main resonance of the vibration damping device should, as precisely as possible, lie on the main resonance of the entire flywheel mass. The balancing takes place, on one hand, via the weight of the tuned mass damper elements (in particular, by adjusting their size) and via the rigidity of the connection of the tuned mass damper elements (for example, by adjusting the cross sections of the damping rings). This balancing must be done once per flywheel mass type. If a new flywheel mass or a new flywheel mass type is designed, then the size and the weight of the tuned mass dampers must be designed once using FEM simulation. Due to the resonance of the fastening means (for example, of the damping rings) with the tuned mass damper elements, an enhanced relative movement is created and, as a result thereof, a dissipation of energy which effects an enhanced damping.

The vibration damping effect can, on one hand, be effected by the tuned mass damper means. Additionally, it is optionally also possible to effect an additional vibration damping in the contact areas between the damping rings and the support means (for example, the spokes) by specific friction.

The tuned mass damper elements and the damping rings supporting them are balanced in such a manner that the tuned mass damper elements in the aforementioned case of resonance vibrate contrary to the flywheel ring swinging up in the axial direction and thus absorb or dampen the vibration. In principle, a shift of energy from the upswinging flywheel ring to the upswinging tuned mass damper, which "counteracts it" so to speak, takes place.

Such structured flywheels can have a weight in a range from, e.g., 100 g to approx. 20 kg. With correspondingly equipped flywheels, a spin of, e.g., up to 100 Nms or even up to 150 Nms can be achieved.

These and additional advantages and features are explained in more detail in the following text, based on examples with the aid of the accompanying figures, in which:

FIGS. 1 to 4 show a flywheel in different views.

The flywheel has a hub 1 with a plurality of boreholes 2 through which the hub 1 can be fastened on a bearing means not shown. The flywheel is, through the bearing means not shown, rotatably held or set rotating to achieve the desired gyroscopic effect.

Figure 3:
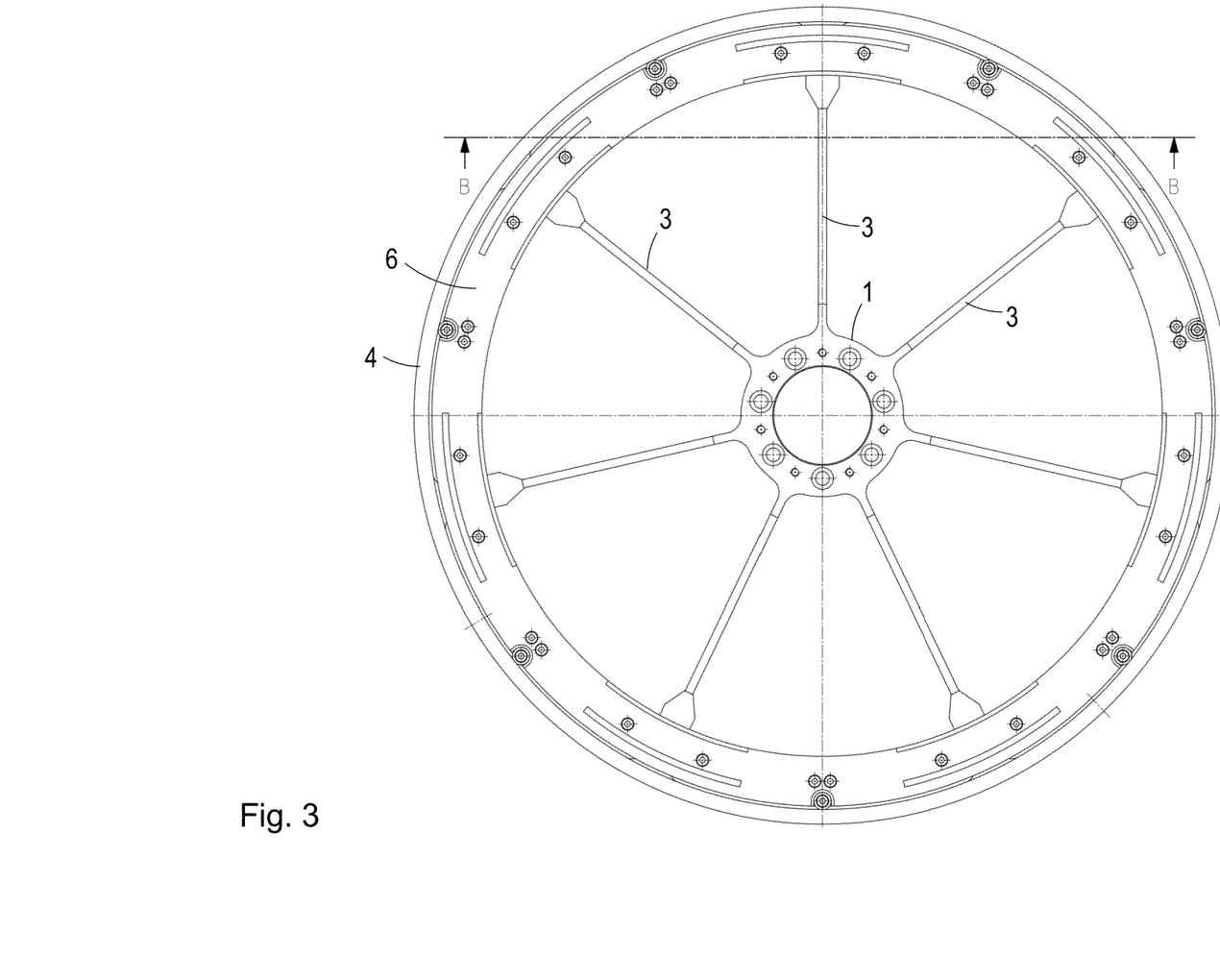
FIG. 3 shows a top view of the flywheel of FIG. 1.

A plurality of spokes 3, which serve as the support means, extends radially outwards from hub 1. A total of seven spokes 3 are provided in the embodiment shown in FIG. 1. Generally, it is recommended that the number of spokes is uneven, preferably corresponding to a prime number. As shown in FIG. 3, the spokes 3 are kept relatively thin for weight reasons.

The spokes jointly support a circumferential flywheel ring 4 on their ends in a manner known per se. For stabilization and for precise mounting, corresponding support elements 5 can be provided on the ends of the spokes.

The previously described structure corresponds to a customary flywheel as known from the prior art.

In accordance with the invention, two circumferential damping rings 6 are provided which are arranged axially to one another and enclose the spokes 3, precisely said, the outer ends of the spokes 3, between them. The damping rings 6 are screwed together with the aid of screws 7.

By adjusting the screws 7, the clamping force can be adjusted between the damping rings 6 and the spokes 3, in particular, the support elements 5 of the spokes 3.

Centrally between the particular ends of the spokes 3, tuned mass damper elements 8 are arranged between the damping rings 6 and fastened on the damping rings 6 by screws 9. The tuned mass damper elements 8 form, in cooperation with the damping rings 6, a vibration damping device. The tuned mass damper elements 8 are designed as cylindrical radiators and are firmly held on the damping rings 6 through multiple screwing by the screws 9.

In addition, immediately in the vicinity of the tuned mass damper elements 8, centering rollers 10, which serve as the centering means, are provided which are fastened on top and bottom of the respective damping rings 6 by screws 11. The centering rollers 10 run on an inner perimeter 12 of the flywheel ring 4 and serve to center the two damping rings 6 and the tuned mass damper elements 8 supported by them. In this process, it should be noted that the tuned mass damper elements 8 bring an enormous weight with them, which can effect corresponding centrifugal forces when the flywheel is rotated. Due to the particular centering rollers 10, the vibration damping device consisting of the damping rings 6 and the tuned mass damper elements 8 can be reliably centered and stabilized.

The damping rings 6 are, in relation to the other building components, designed very thin and thus have a higher elastic ductility or lower rigidity. In the areas where the damping rings 6 contact the ends of the spokes 3, particular reinforcement elements 13 are placed on the damping rings 6 on the outside. The reinforcement elements 13 can be integrally formed with the particular damping ring 6. However, they can additionally be mounted on the damping ring 6, for example, by a bonding or welding method.

The reinforcement elements 13 serve to stiffen the damping rings 6 in the corresponding areas.

Accordingly, the damping rings 6 have areas with increased rigidity or lower elastic ductility on the perimeter (areas at the ends of the spokes 3 or on the screw connection points of the screws 7), as well as areas of increased elastic ductility (lower rigidity) in the areas on which the tuned mass damper elements 8 are fastened.

During the launch of a rocket, the flywheel ring 4 is excited by the impacting vibrations to vibrate axially back and forth in the axial direction (direction X).

Due to the low rigidity of the damping rings 6 or their increased elastic ductility, the tuned mass damper elements 8 are now, in turn, capable of axially vibrating back and forth in the opposite direction, so that vibrational movement is generated in this manner, which counteracts the vibrational movement of the flywheel ring 4. Due to the superposition of the vibrational movements, the resonance rise can, as a whole, be reduced significantly or can largely be excluded. Thus, the harmful impacts of a flywheel set into resonance on especially the bearing means can be reduced significantly.

Figure 5:
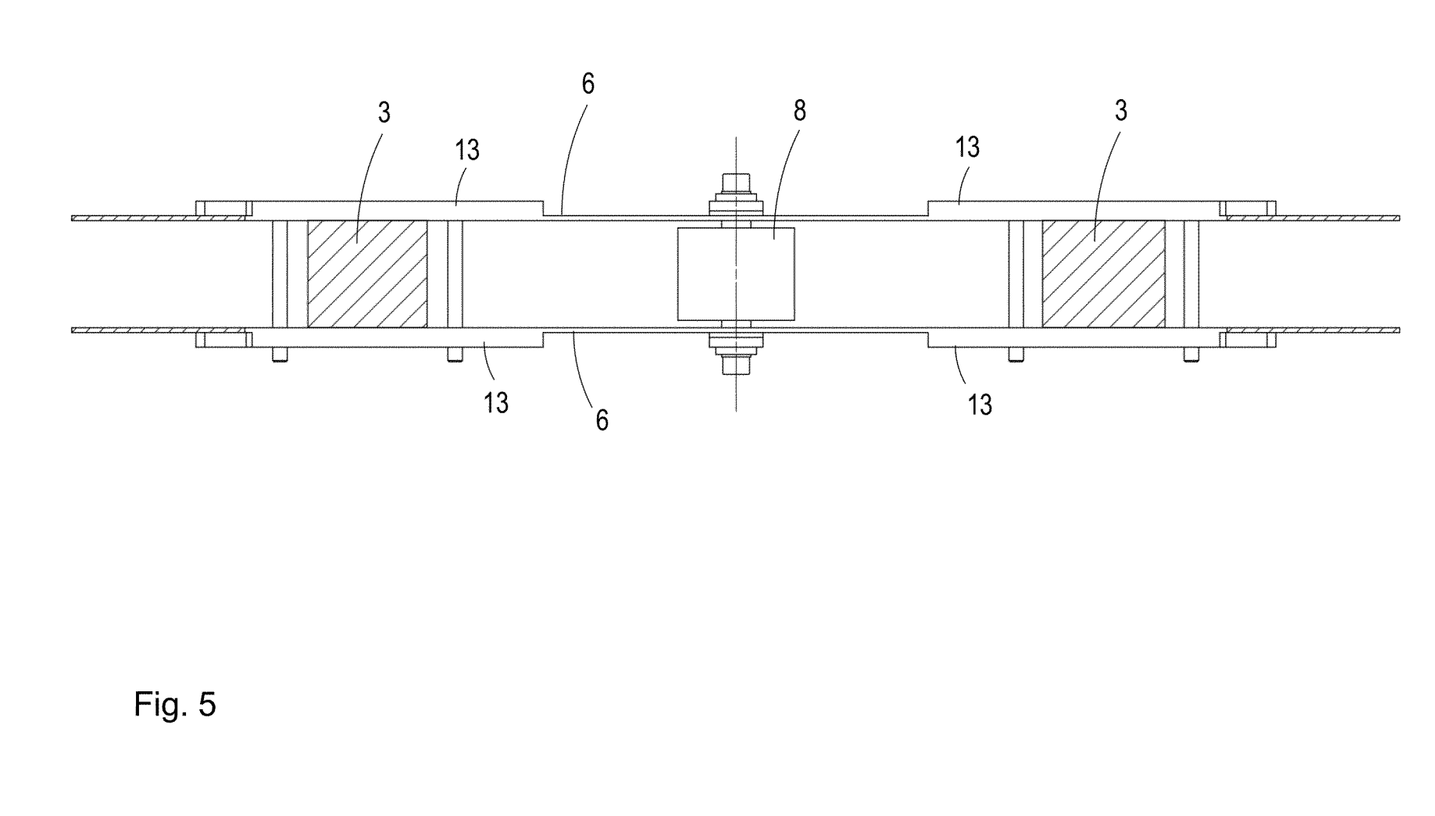
FIG. 5 shows another sectional view.

FIG. 5 shows the previously described structure in an additional partial sectional view, with the section running along the damping rings 6 in the peripheral direction. In this process, only the two spokes 3 are sectioned, while the other elements are shown unsectioned.

Due to this representation, it can easily be recognized that the damping rings 6 are designed reinforced and thus more rigid in the areas of fastening on the spokes 3 than in those areas in which the tuned mass damper elements 8 are fastened.

In the previously described embodiment, the damping rings 6 are firmly connected to the spokes 3 supporting them in such a manner that they are floatingly supported on the spokes 3. Since the damping rings 6 are connected by the screws 7 between them, they are pressed against the spokes 3 and braced against the spokes 3. Thus, in the case of axial resonance of the flywheel ring 4, a relative movement between the damping rings 6 and the support areas for the spokes can emerge.

In a variant with an optionally realizable, supplementary vibration damping, it is possible to purposefully allow low relative movements and thus friction in the contact areas on which the damping rings 6 lie on the spokes 3 in order to achieve further vibration damping effects.

Figure 1:
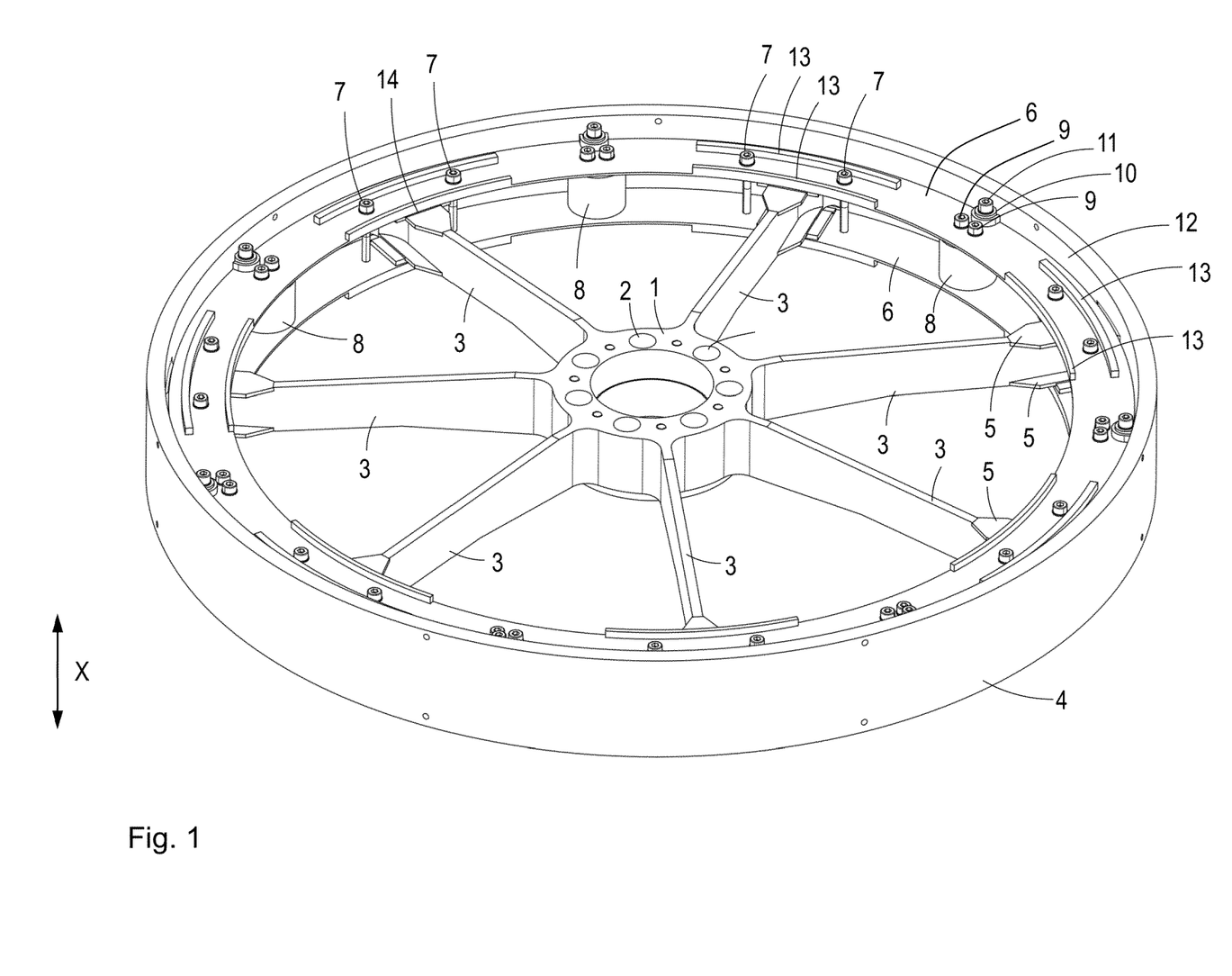
FIG. 1 shows a perspective view of a flywheel.
Figure 2:
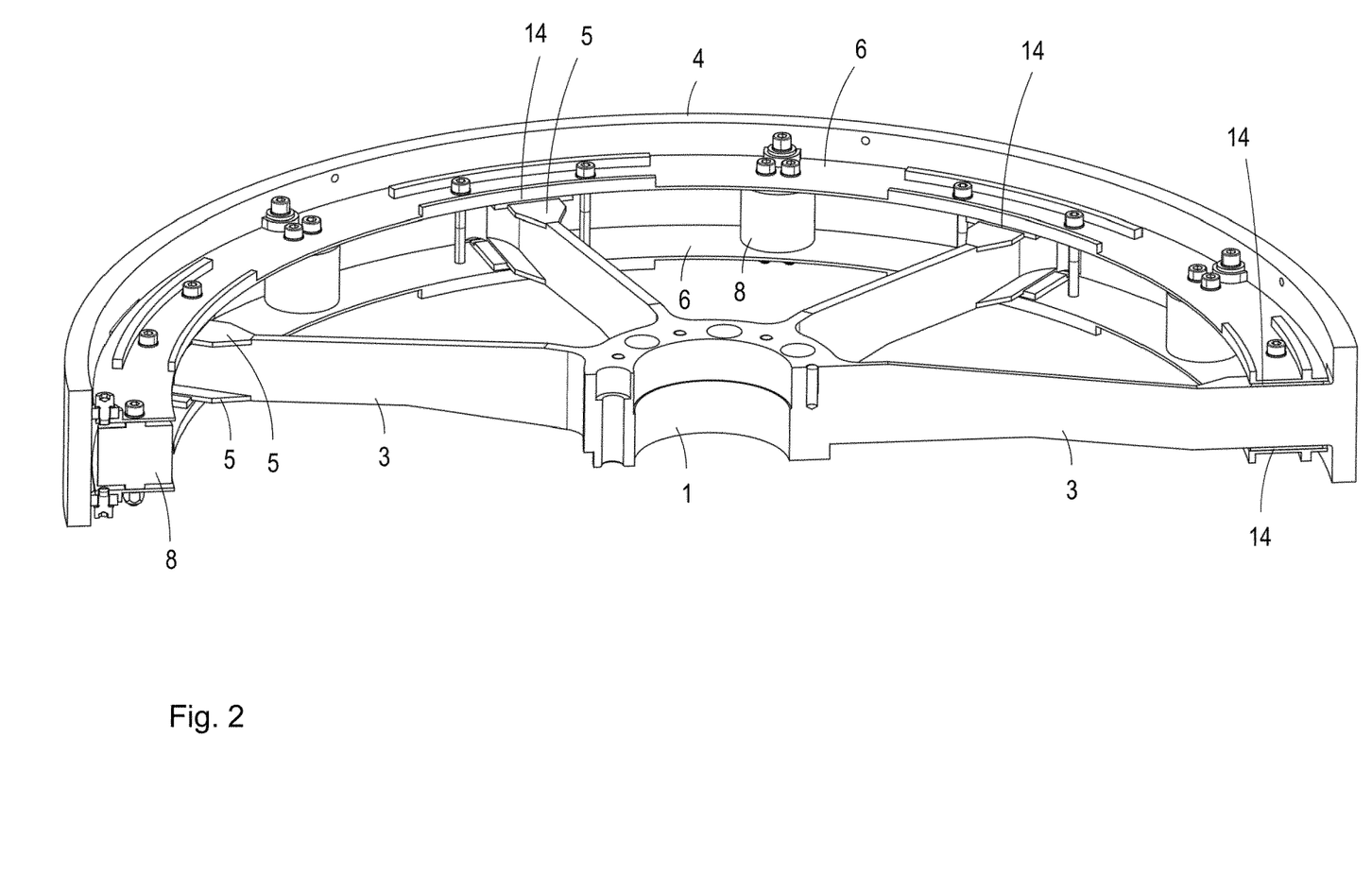
FIG. 2 shows a sectional view of the flywheel of FIG. 1.
Figure 4:
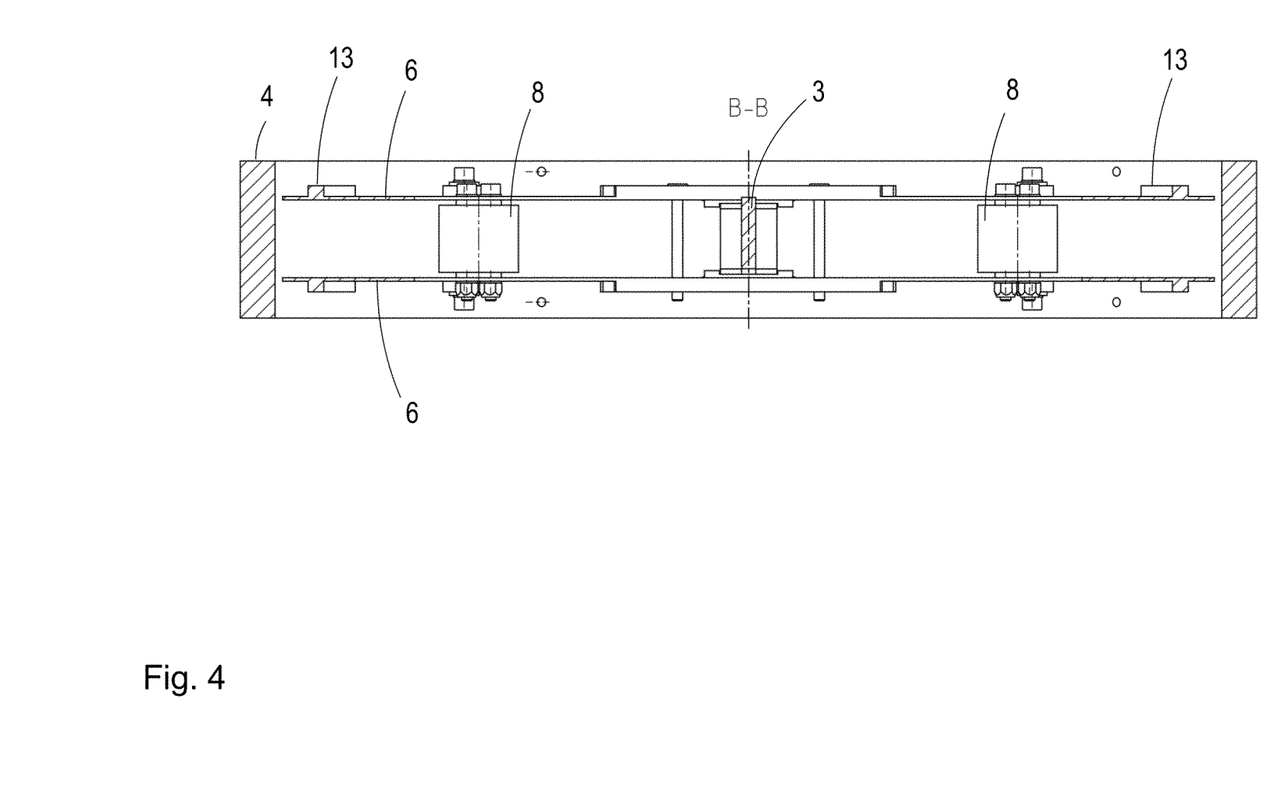
FIG. 4 shows a sectional view along the line B-B in FIG. 3.

For this purpose, corresponding friction support pads 14 are inserted at the contact areas, which can, in particular, be seen in FIGS. 2 and 4. In the version of FIG. 5, friction support pads 14 are not present.

Thus, the friction support pads 14 can optionally be provided in addition to the tuned mass damper means.

The friction support pads 14 can have a U-shaped cross section, as can be seen in FIGS. 2 and 4, and thus laterally surround the support elements 5 which are provided on the extensions of the spokes 3. Thus, it is ensured that the friction support pads 14 are held stationary at the ends of the spokes 3.

In the case of low excitation of vibrations, the clamping forces acting between the damping rings 6 and the friction support pads 14 present within the contact areas ensure that the damping rings 6 are firmly coupled to the movement of the flywheel mass, especially of the flywheel ring 4, and that all movements are transferred to the flywheel ring 4. Static friction then exists between the friction support pads 14 and the damping rings 6.

If one of the main modes of the flywheel mass is excited, the flywheel ring 4 swings up in respect of the hub 1. These eigenmodes are the critical case, the amplitude of which must be kept as small as possible in the resonance case. As soon as the vibration amplitude becomes that large that the static friction within the contact areas with the damping rings 6 is exceeded, the damping rings 6 can slide relative to the spokes 3 or the flywheel ring 4 or the friction support pads 14. Two systems with different resonance frequencies, which move relatively to one another, are thereby created.

In this process, the relative movement can be very low and, for example, be less than 1 mm. For example, it has turned out that a relative movement between 0.2-0.3 mm (vibration amplitude) is sufficient to achieve an efficient vibration damping with the aid of the friction support pads 14.

Figure 6:
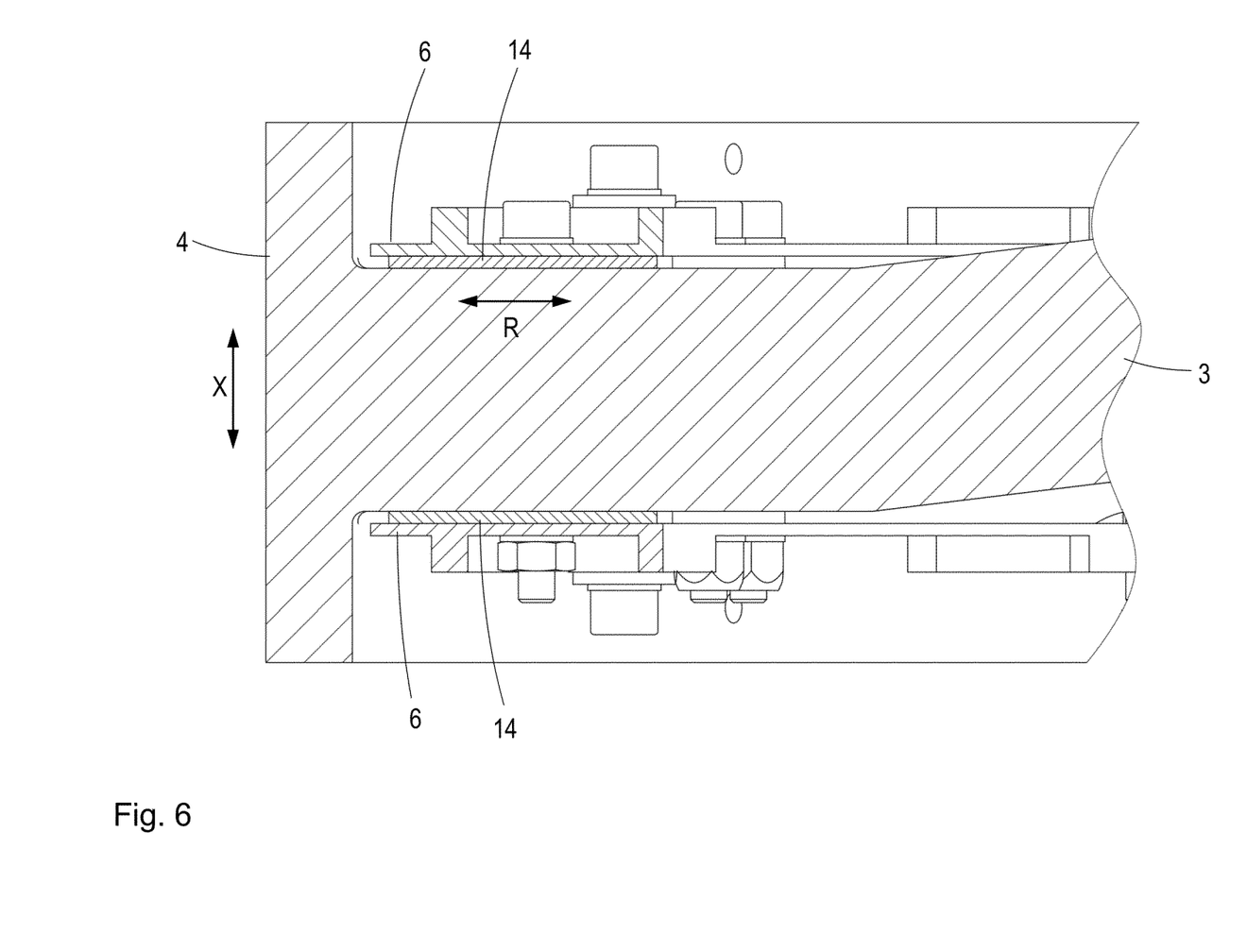
FIG. 6 shows a sectional view to explain the friction support pads.

FIG. 6 shows the mode of operation in an enlarged detailed sectional view.

In this process, the extension on the radial side of the spoke 3 represented in section is integrally connected to the flywheel ring 4. A friction support pad 14 is inserted between the damping rings 6.

If the flywheel ring 4 vibrates in the axial direction X in the resonance case or in the case of a corresponding excitation of vibrations, relative movement in the radial direction R emerges between the damping rings 6 and the friction support pads 14 after the static friction has been overcome.

Figure 7:
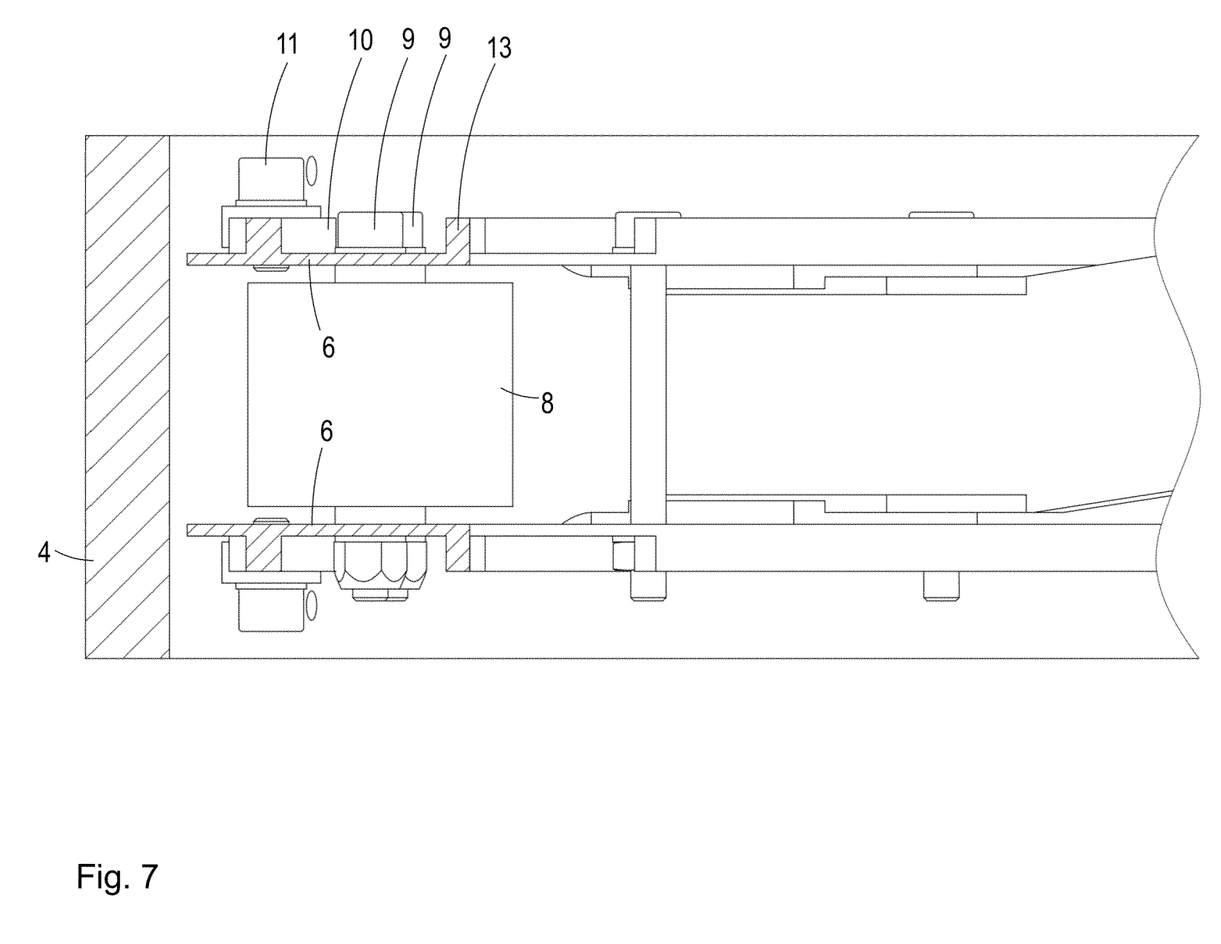
FIG. 7 shows a sectional view with a tuned mass damper element.

FIG. 7 supplementarily shows an enlarged detailed representation with a tuned mass damper element 8 held between the two damping rings 6.

The invention claimed is:

1. A flywheel for stabilizing the position of a spacecraft, comprising:
   a hub means for fastening the flywheel;
   a flywheel ring which externally surrounds the hub means circumferentially at a distance;
   a support means for supporting the flywheel ring on the hub means;
   a vibration damping device with a tuned mass damper means which, with respect to a rotation axis of the flywheel, is axially movable back and forth relative to the flywheel ring; and
   centering rollers which abut on an inner diameter of the flywheel ring and center the vibration damping device,
   wherein the tuned mass damper means is fastened on the flywheel ring and/or on the support means by a fastening means,
   wherein the fastening means is designed in such a manner that it enables axial movability of the tuned mass damper means,
   wherein the tuned mass damper means has a plurality of tuned mass damper elements which are held, distributed on a perimeter of the flywheel ring at a distance, by the fastening means.

2. The flywheel of claim 1, wherein the fastening means has elastic ductility in at least one area, and wherein the axial movability of the tuned mass damper means is achievable by the elastic ductility of the fastening means.

3. The flywheel of claim 1, wherein the fastening means has two damping rings arranged axially to one another in such a manner that the support means is arranged at least partially in between, and wherein the two damping rings are fastened to one another in such a manner that the support means is, seen in the axial direction, arranged between the two damping rings.

4. The flywheel of claim 3, wherein the tuned mass damper elements are held between the two damping rings and are arranged distributed along the peripheral direction of the two damping rings, wherein the two damping rings have areas of higher elasticity and lower elasticity along their perimeter, and wherein the tuned mass damper elements are fastened in the areas with higher elasticity.

5. The flywheel of claim 4, wherein the support means has a plurality of spokes distributed on the perimeter, which extend radially between the hub means and the flywheel ring.

6. The flywheel of claim 5, wherein the tuned mass damper elements are arranged in interspaces between the spokes and held by the damping rings.

7. The flywheel of claim 3, wherein the two damping rings are fastened to one another in such a manner that relative movement between the two damping rings and the support means is enabled.

8. The flywheel of claim 3, wherein in an area of a contact area of the two damping rings with the support means, a friction support pad is provided at least partially between one of the damping rings and the corresponding area of the support means.

9. The flywheel of claim 1, wherein the support means has a plurality of spokes distributed on the perimeter, which extend radially between the hub means and the flywheel ring.

10. The flywheel of claim 1, wherein a main resonance of the tuned mass damper means is adjustable in such a manner that the main resonance essentially corresponds to the main resonance of the flywheel ring or of the flywheel, and wherein the main resonance of the tuned mass damper means is adjustable by balancing the weight of the tuned mass damper elements and of the elastic ductility of the fastening means.

11. A flywheel, comprising:
    a hub;
    a flywheel ring externally surrounding the hub circumferentially at a distance;
    a plurality of spokes extending radially outwards from the hub and supporting the flywheel ring;
    two damping rings arranged axially to one another and enclosing distal ends of the spokes between the two damping rings;
    tuned mass damper elements arranged between and fastened on the two damping rings such that the tuned mass damper elements have axial movability; and
    centering rollers fastened on top and bottom of the two damping rings,
    wherein the tuned mass damper elements form, in cooperation with the two damping rings, a vibration damping device, wherein the vibration damping device, with respect to a rotation axis of the flywheel, is axially movable back and forth relative to the flywheel ring, wherein the tuned mass damper elements are distributed on a perimeter of the flywheel ring, wherein the tuned mass damper elements are cylindrical radiators firmly held on the two damping rings through a plurality of screws, wherein the centering rollers run on an inner perimeter of the flywheel ring and center the two damping rings and the tuned mass damper elements.

12. The flywheel of claim 11, further comprising:
reinforcement elements placed on the two damping rings in areas where the two damping rings contact the distal ends of the spokes.

13. The flywheel of claim 12, wherein the reinforcement elements are integrally formed with the two damping rings.

14. The flywheel of claim 12, wherein the reinforcement elements are mounted on the two damping rings.

15. The flywheel of claim 11, wherein the two damping rings have areas with increased rigidity or lower elastic ductility on at the distal ends of the spokes, and areas of increased elastic ductility in areas on which the tuned mass damper elements are fastened.

* * * * *